(12) United States Patent
Miller

(10) Patent No.: US 8,943,758 B2
(45) Date of Patent: Feb. 3, 2015

(54) SHELTER

(75) Inventor: Todd William Miller, Tupelo, MS (US)

(73) Assignee: MJ Outdoors, LLC, New Madrid, MO (US)

( * ) Notice: Subject to any disclaimer, the term of this patent is extended or adjusted under 35 U.S.C. 154(b) by 0 days.

(21) Appl. No.: 13/587,574

(22) Filed: Aug. 16, 2012

(65) Prior Publication Data

US 2014/0047781 A1  Feb. 20, 2014

(51) Int. Cl.
E04H 9/00 (2006.01)

(52) U.S. Cl.
USPC ............ 52/79.5; 52/70; 52/71; 446/478

(58) Field of Classification Search
USPC ............ 52/64, 66, 70, 71, 79.5; 446/478, 488
See application file for complete search history.

(56) References Cited

U.S. PATENT DOCUMENTS

| | | | | |
|---|---|---|---|---|
| 2,441,076 A * | 5/1948 | Makrianes | ............... | 446/75 |
| 2,837,777 A * | 6/1958 | White | ............... | 52/27 |
| 3,018,857 A | 1/1962 | Parham | | |
| 3,507,293 A | 4/1970 | Du Bray | | |
| 3,566,554 A * | 3/1971 | Schaffer | ............... | 52/64 |
| 3,629,875 A * | 12/1971 | Dow et al. | ............... | 4/599 |
| 3,838,545 A * | 10/1974 | Kump | ............... | 52/79.8 |
| 4,037,385 A * | 7/1977 | Wahlquist | ............... | 52/745.02 |
| 4,239,247 A | 12/1980 | Hinz | | |
| 4,683,672 A | 8/1987 | Davis | | |
| 4,870,984 A | 10/1989 | Roth | | |
| D317,734 S | 6/1991 | Cunha et al. | | |
| 5,271,423 A | 12/1993 | Eychaner | | |
| 5,482,490 A * | 1/1996 | Weldon-Ming | ............... | 446/75 |
| 5,724,774 A * | 3/1998 | Rooney | ............... | 52/79.5 |
| 5,768,829 A * | 6/1998 | Thompson et al. | ............... | 52/86 |
| 5,906,217 A | 5/1999 | Hill | | |
| 5,960,592 A * | 10/1999 | Lilienthal et al. | ............... | 52/79.1 |
| 6,397,870 B1 | 6/2002 | Makedonsky et al. | | |
| 6,415,807 B1 | 7/2002 | Maher | | |
| 6,607,421 B1 * | 8/2003 | Rossi | ............... | 446/478 |
| 7,552,563 B2 * | 6/2009 | Becker | ............... | 52/79.5 |
| D623,242 S * | 9/2010 | Greer | ............... | D21/511 |
| 2010/0093257 A1 * | 4/2010 | Elliott | ............... | 446/478 |

* cited by examiner

Primary Examiner — Adriana Figueroa
(74) Attorney, Agent, or Firm — Senniger Powers LLP

(57) ABSTRACT

A shelter including a wall unit having walls. Each wall has a top edge, a bottom edge, and opposite side edges extending between the top and bottom edges. Each side edge is joined to a corresponding side edge of an adjacent wall to form a corner of the wall unit. The wall unit includes an access port in at least one wall. The shelter includes an upper rigid shell having a central portion surrounded by a channel for receiving the top edges of walls of the wall unit so the upper shell forms a roof of the shelter. The shelter includes a lower rigid shell having a central portion surrounded by a channel for receiving the bottom edges of walls of the wall unit so the lower shell forms a floor of the shelter.

12 Claims, 7 Drawing Sheets

SHELTER

BACKGROUND

The present invention generally relates to temporary shelters, and more particularly, to a collapsible shelter adapted for transporting to a remote site.

Temporary shelters are used in many situations, such as to provide shelter and camouflage for hunters, bird watchers, outdoor photographers, and ice fisherman. The shelters can also be used to temporarily store equipment and gear. In general, such shelters are used to camouflage people and their equipment, and to shelter people and equipment from the environment, including extreme temperatures, precipitation, wind, and sun. In some cases, such shelters are permanent structures are used for such shelter and these permanent structures usually work well for their intended purpose, but they are not generally suitable when shelter is desired in a different location.

Although portable shelters are known, there remains a need for a portable shelter that can be quickly assembled and disassembled, is compact for storage and transport, is relatively inexpensive to make and use, provides adequate protection from the environment, and provides suitable camouflage for people and their equipment.

SUMMARY

In one aspect, the present invention includes a shelter. The shelter comprises a wall unit having a plurality of walls. Each wall has a top edge, a bottom edge opposite the top edge, and opposite side edges extending between the top edge and the bottom edge. Each of the opposite side edges is joined to a corresponding side edge of an adjacent wall to form a corner of the wall unit. The wall unit includes an access port in at least one wall for at least one of entering and leaving the shelter and viewing objects outside while inside the shelter. The shelter includes an upper rigid shell having a central portion surrounded by a channel sized and shaped for receiving the top edges of walls of the wall unit so the upper shell forms a roof of the shelter. The shelter also includes a lower rigid shell having a central portion surrounded by a channel sized and shaped for receiving the bottom edges of walls of the wall unit so the lower shell forms a floor of the shelter.

In another aspect, the present invention includes a method of assembling a shelter comprising walls, an upper rigid shell, and a lower rigid shell. The method comprises orienting the lower rigid shell so a channel of the lower shell faces upward and inserting bottom edges of the walls in the channel of the lower shell. The upper shell is positioned on the walls so a channel of the upper shell receives the top edges of the walls.

In still another aspect, the present invention includes a method of preparing a shelter for transport. The shelter comprises a wall unit, an upper rigid shell, and a lower rigid shell. The upper shell is removed from the wall unit and oriented so a channel of the upper shell faces upward. The wall unit is lifted out of a channel in the lower shell, folded to a flat configuration, and positioned on top of the upward oriented upper shell so the wall unit is entirely received in a rim surrounding the upper shell. The lower shell is positioned so the channel of the lower shell faces the folded wall unit and the lower shell is entirely received in the rim of the upper shell. The upper shell and the lower shell are joined to hold the wall unit between the upper shell and the lower shell.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
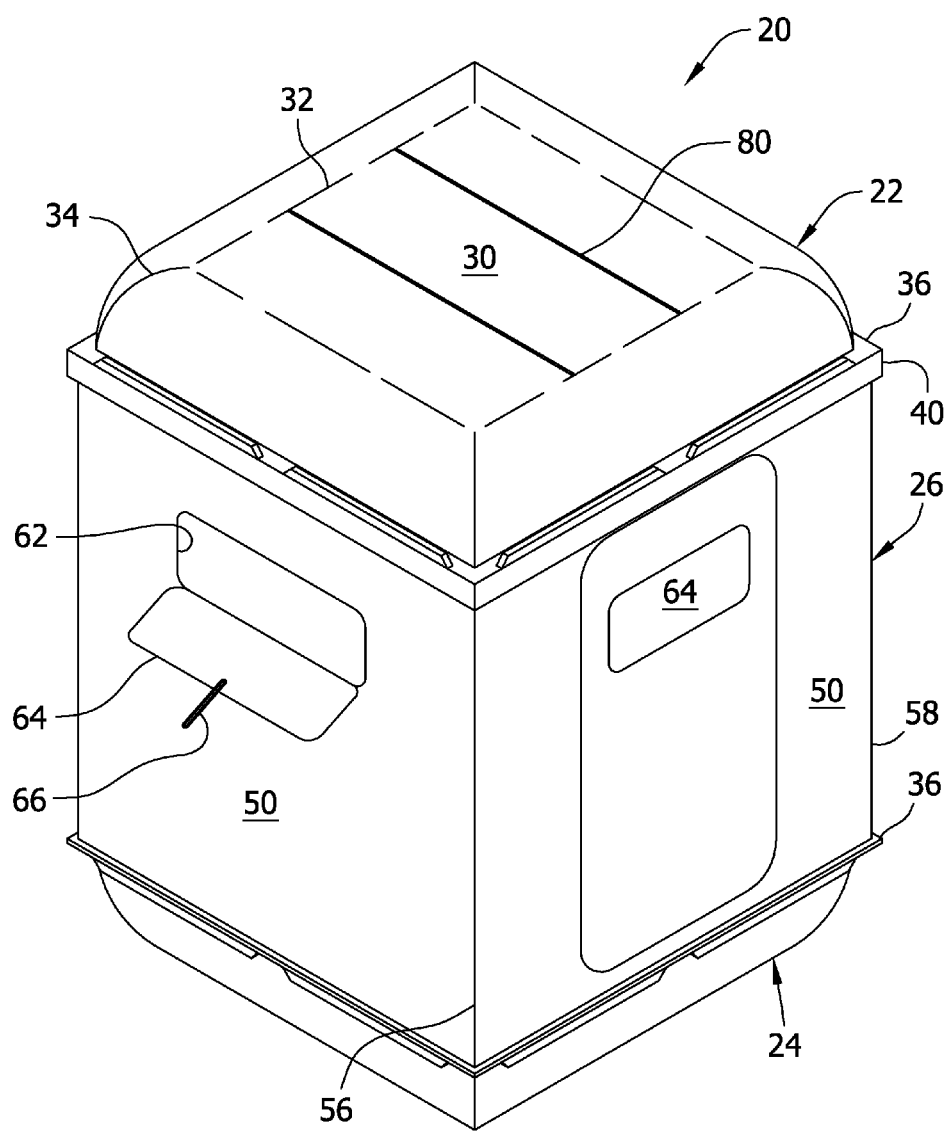
FIG. 1 is a perspective of a shelter of the present invention.
Figure 2:
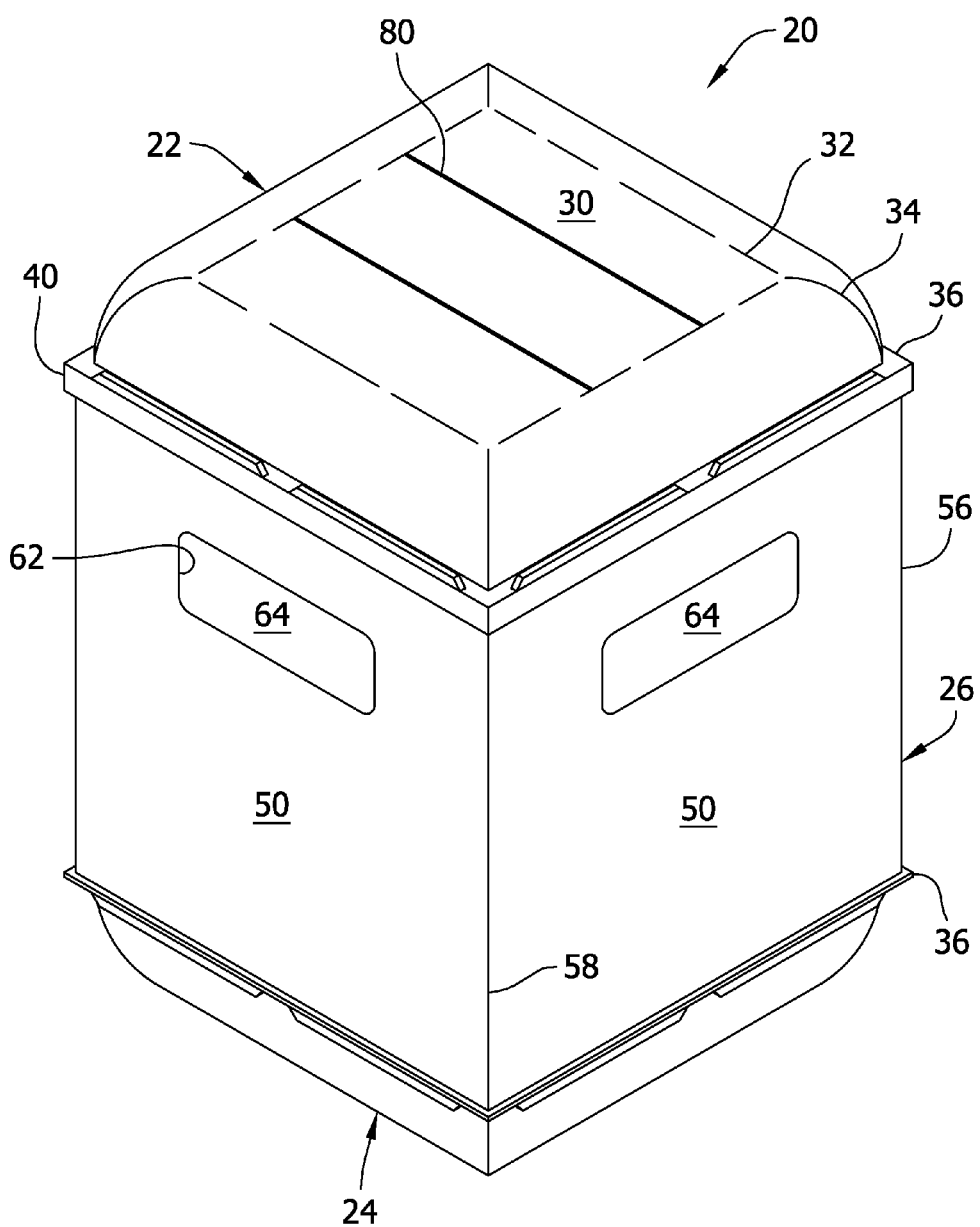
FIG. 2 is a reverse angle perspective of the shelter of FIG. 1.

Referring to FIGS. 1 and 2, a shelter of the present invention is designated in its entirety by the reference number 20. The shelter 20 generally comprises upper and lower rigid shells (generally designated by 22, 24, respectively) forming a roof and a floor of the shelter, respectively. The upper and lower shells 22, 24 are spaced by a wall unit (generally designated by 26).

Each of the rigid shells 22, 24 include a central portion 30 having a flat section 32 surrounded by a curved frame 34 and an outer flange 36. Channels 38 (FIGS. 3 and 4) are formed in the flange 36 for holding the wall unit 26. The upper rigid shell 22 also includes an uninterrupted rim 40 extending around its outer flange 36. In all other respects, the upper and lower rigid shells 22, 24 are identical to each other in the illustrated embodiment. In some embodiments, the upper and lower shells 22, 24 have four sides, but they may have fewer or more sides without departing from the scope of the present invention. In the illustrated embodiment, the upper and lower shells 22, 24 are square when viewed from above. Although the shells 22, 24 may be made using other methods without departing from the present invention, in some embodiments the shells are made using a conventional vacuum molding process. Further, the shells 22, 24 are made using identical molds and trimmed differently so the upper shell 22 has the rim 40 and the lower shell 24 does not. Although the shells 22, 24 may be made from other materials without departing from the scope of the present invention, in some embodiments the shells are made from high density polyethylene. Although the shells 22, 24 may have other thicknesses without departing from the scope of the present invention, in some embodiments, the shells having a nominal thickness of about 4 millimeters (mm).

As further shown in FIGS. 1 and 2, the wall unit 26 has a plurality of walls, each generally designated by 50. In some embodiments, the wall unit 26 has four walls 50, but it may have fewer or more walls without departing from the scope of the present invention. Each wall 50 has a top edge 52 (FIG. 3), a bottom edge 54 (FIG. 4) opposite the top edge, and opposite side edges 56 extending between the top edge and the bottom edge. Each side edge 56 is joined to a corresponding side edge of an adjacent wall 50 to form a corner 58 of the wall unit 26.

Figure 6:
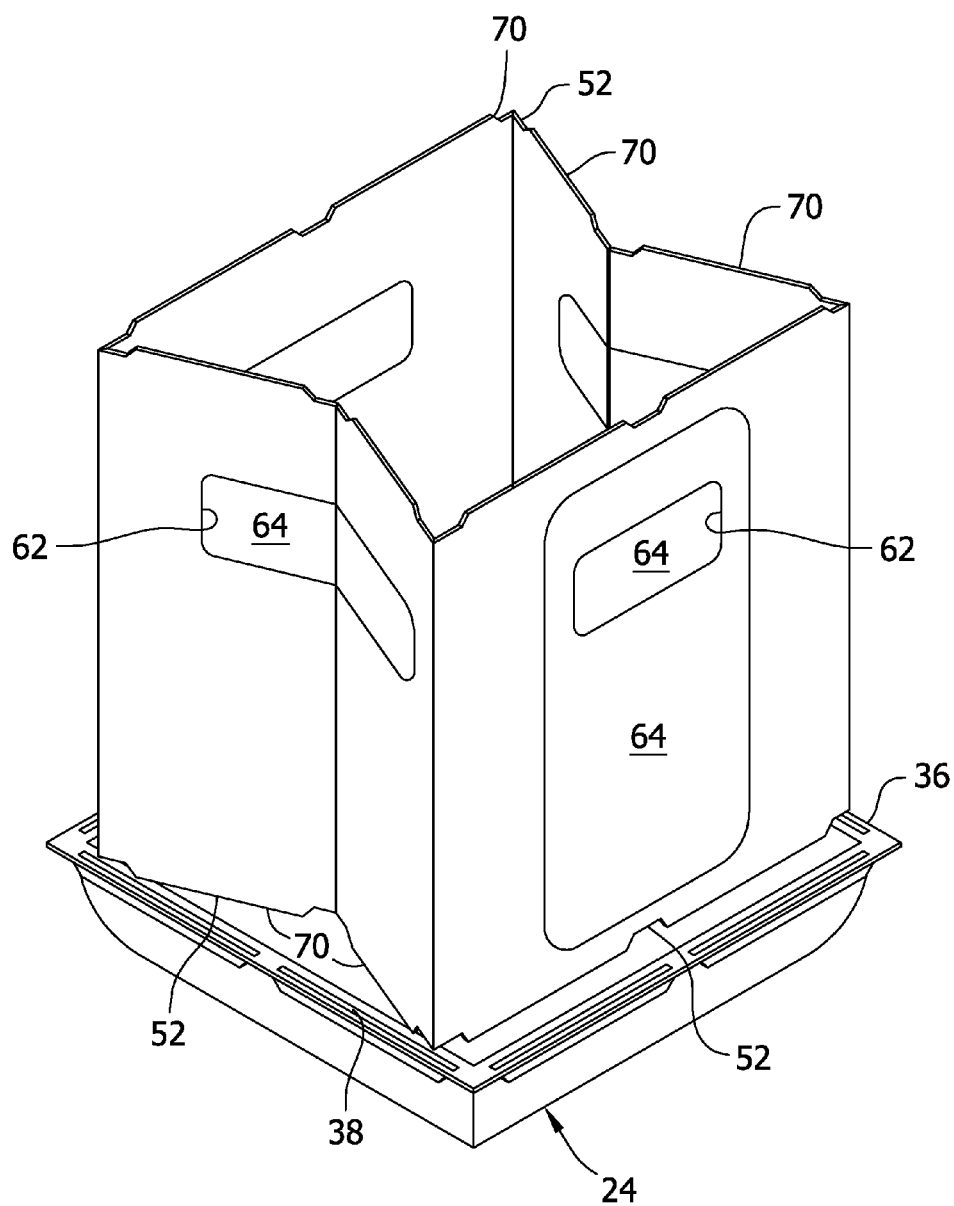
FIG. 6 is a perspective of the shelter in a partially collapsed configuration.

In the illustrated embodiment, the top and bottom edges 52, 54 of the walls 50 all have equal lengths, but the edges may have different lengths without departing from the scope of the present invention. Although the wall unit 26 may be made from other materials without departing from the scope of the present invention, in some embodiments the wall unit is made from corrugated plastic sheet having a nominal thickness in range of about 2 mm to about 25 mm. In some embodiments, the sheet has a nominal thickness in a range of about 8 mm to about 12 mm. More particularly, in some embodiments, the sheet has a nominal thickness of about 5 mm. Although other plastics may be used, in one embodiment, the plastic is high-density polyethylene and/or polypropylene plastic. In some embodiments, the sheet is die cut to final size and shape. The die-cut sheet is folded at the corners 58 and its opposite ends are joined with adhesive to form a continuous wall unit 26. In addition to corners 58, a pair of opposite walls 50 of the wall unit 26 fold inward at their respective centers for collapsing the wall unit as shown in FIG. 6. In one embodiment the other opposing walls 50 do not fold inward (i.e., they are foldless).

When the sheet is die cut, various access ports are formed in the walls. For example, at least one access port is a door 60 for entering and leaving the shelter, and other access ports are windows 62 through which the person can see out while inside the shelter as shown in FIGS. 1 and 2. Each of the windows 62 includes a flap 64 for selectively covering the respective window. The flaps 64 may have straps 66 for ease in closing the flaps. Lastly, the top and bottom edges 52, 54, respectively, of the wall unit 26 are cut so they have tabs 70. The tabs 70 correspond with the shape of channels 38 in the upper and lower shells 22, 24, respectively. Although the top and bottom edges 52, 54, respectively, of each wall 50 of the wall unit 26 may have fewer or more tabs 70 without departing from the scope of the present invention, in one embodiment each edge has two tabs. The die cutting and folding operations also control the overall size of the walls 50. Although the walls 50 may have other dimensions without departing from the scope of the present invention, in one embodiment the walls are nominally 122 centimeters (cm) tall and 122 cm wide.

Figure 3:
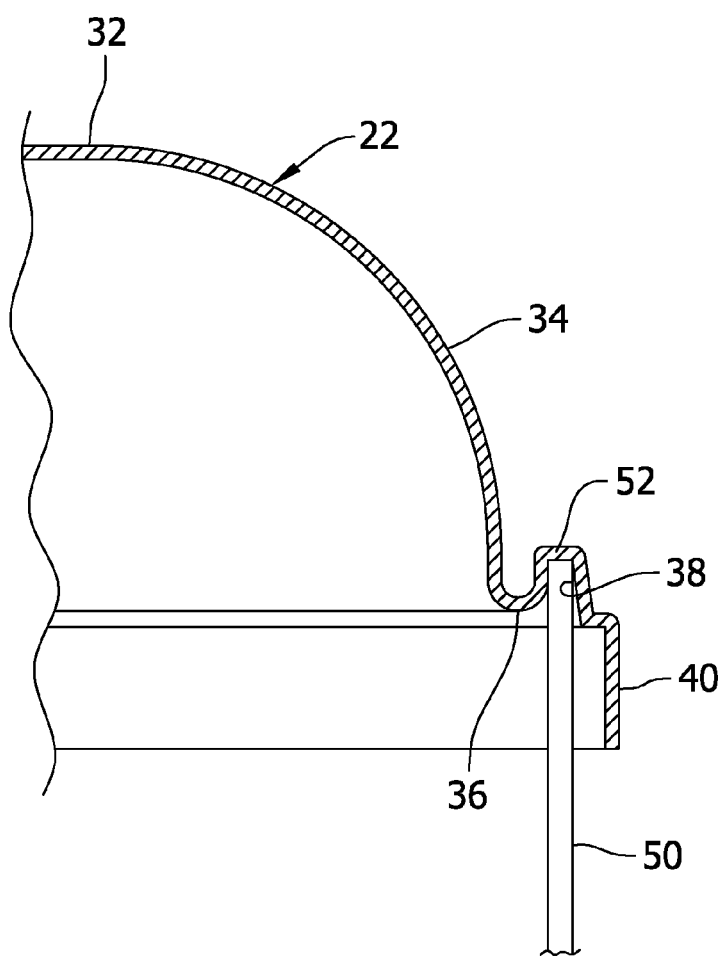
FIG. 3 is a cross section of an upper portion of the shelter taken along line 3-3 of FIG. 1.
Figure 4:
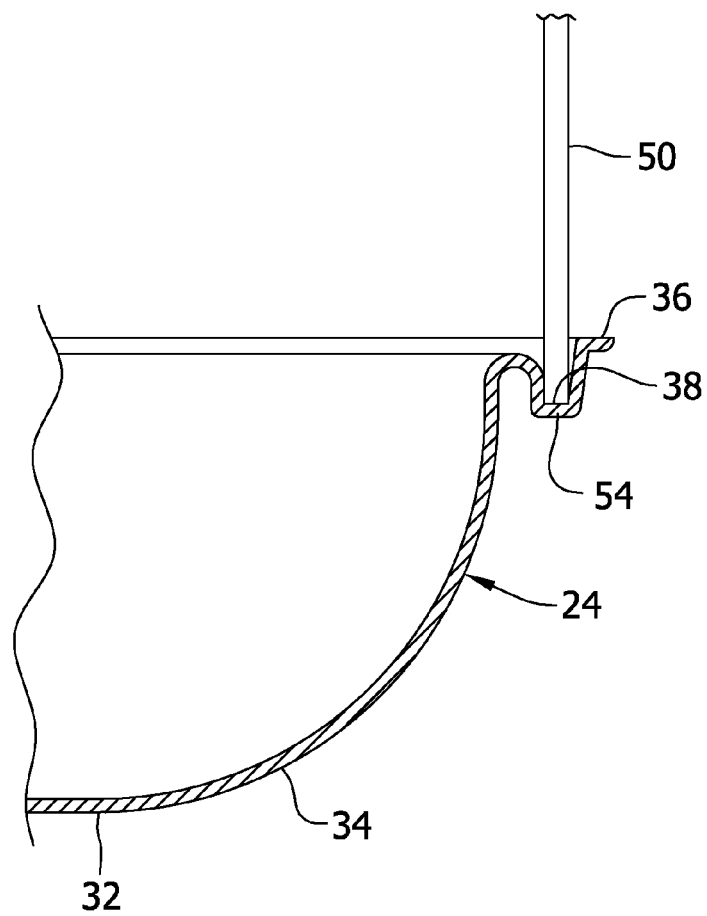
FIG. 4 is a cross section of a lower portion of the shelter taken along line 4-4 of FIG. 1.
Figure 5:
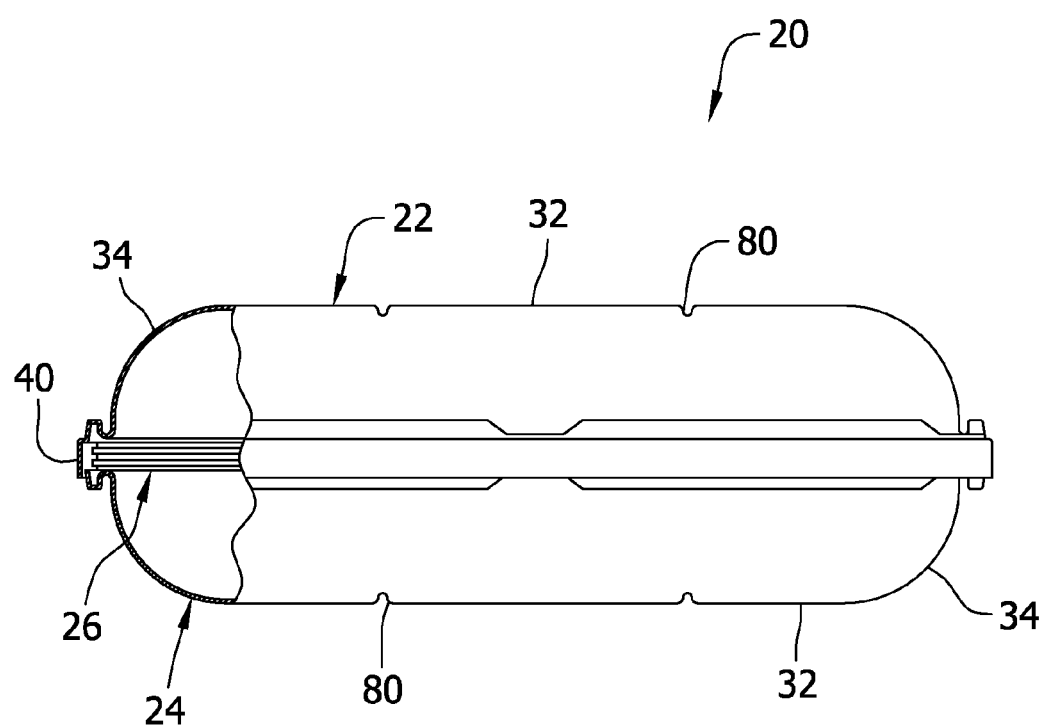
FIG. 5 is a fragmentary front elevation of the shelter in a collapsed configuration.
Figure 7:
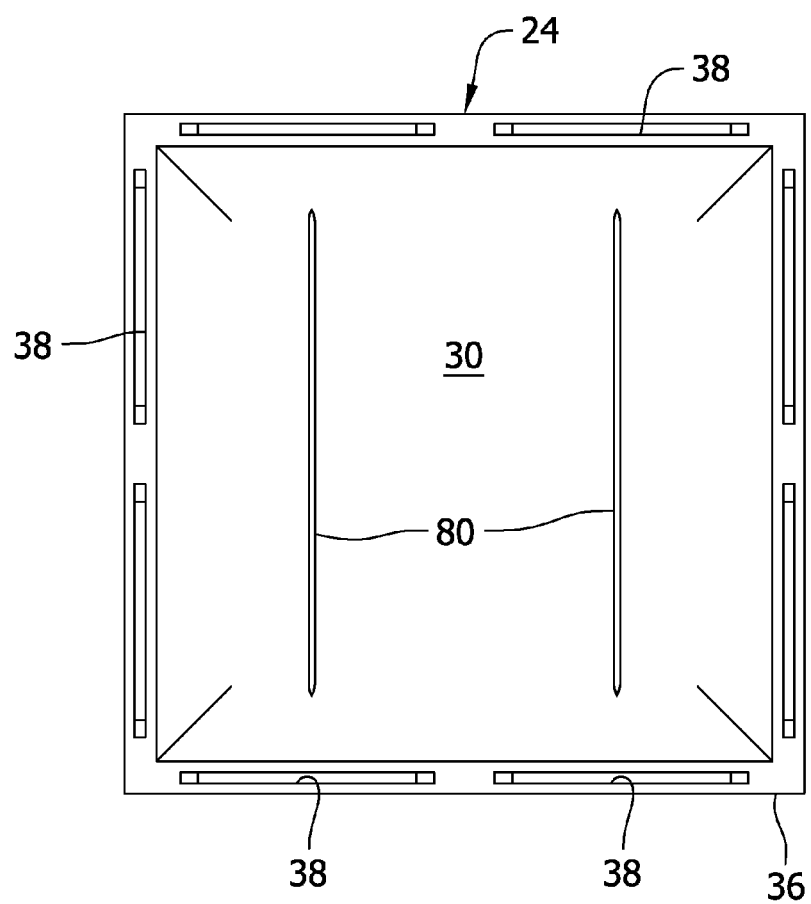
FIG. 7 is a bottom plan of the shelter in the collapsed configuration.

As shown in FIGS. 3 and 4, the upper and lower rigid shells 22, 24, respectively, have flanges 36. Channels 38 in each of the flanges 36 are sized and shaped for receiving the corresponding edges 52, 54 of the walls 50. As previously mentioned, the upper rigid shell 22 also includes an uninterrupted rim 40 extending around its outer flange 36. As shown in FIG. 5, the rim 40 receives the folded wall unit 26 and the flange 36 of the lower shell 24 when the shelter 20 is collapsed for storage and transport. When collapsed, the shells 22, 24 of the shelter 20 are in face-to-face relation as shown in FIG. 5. Once in this configuration, the shells 22, 24 may be connected to each other using any conventional means, such as fasteners, clamps, or belts. FIG. 6 shows the wall unit 26 in a partially collapsed configuration. As is evident from FIG. 6, the opposing walls 50 having folds are folded inward until the wall unit 26 is flat before being positioned between the shells 22, 24. FIG. 7 provides a view of the lower shell 24 showing the channels 38 in which the tabs 70 are received when the shelter 20 is assembled for use. FIG. 7 also shows parallel stiffening ribs 80 that extend along the flat section 32 of the central portion 30 of each shell 22, 24.

To assemble the shelter 20 described above, the lower rigid shell 24 is oriented as shown in FIGS. 1 and 2 so its flanges 36 and channels 38 face upward. The wall unit 26 is unfolded and the tabs 70 at the bottom edge 54 of the wall unit are inserted in the channels 38. Finally, the upper shell 22 is positioned on the walls 50 so its channels 38 receive the top edges 52 of the walls.

To collapse the shelter 20 for storage or transport, the process is reversed. The upper shell 22 is removed from the wall unit 26 and oriented so its flanges 36 and channels 38 face upward. The wall unit 26 is lifted out of the channels 38 in the lower shell 24. The wall unit 26 is folded to a flat configuration and positioned on top of the upward facing flanges 36 of the upper shell 22 so the wall unit is entirely positioned inside the rim 40 of the upper shell. The lower shell 24 is positioned so the flanges 36 and channels 38 of the lower shell face the wall unit 26 resting inside the rim 40 of the upper shell 22. The flange 36 of the lower shell 24 is received entirely in the rim 40 of the upper shell 22. Finally, the upper shell 22 and the lower shell 24 are joined using a conventional means to hold the wall unit 26 between them.

As will be apparent to those skilled in the art, the shelter 20 of the illustrated embodiment can be quickly assembled and disassembled. The shelter 20 provides adequate protection and suitable camouflage for people and their equipment. Further, the illustrated shelter 20 is compact for storage and transport. As will be further appreciated by those skilled in the art, equipment such as rifles, binoculars, and food supplies can be loaded inside the upper and lower shells 22, 24 when the shelter 20 is collapsed for reducing overall space required to transport the shelter and equipment. The overall size and shape of the shelter 20 when collapsed is suitable for transporting on top of a vehicle and equipment can be stored in the collapsed shelter during transport similarly to a car-top luggage container.

The materials used in making the shelter 20 are relatively inexpensive and sufficiently durable for extended use. As will be appreciated by those skilled in the art, the upper and lower shells 22, 24 can be nested when the shelter is disassembled so the shelter can be used as a sled to pull equipment into remote sites and remove equipment and/or harvested game from those sites. The upper and lower shells 22, 24 can also be nested to reduce space required for storing the shelter 20 when not in use.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A temporary shelter comprising:
    a wall unit having a plurality of walls, each wall having a top edge, a bottom edge opposite the top edge, and opposite side edges, each of said opposite side edges having a length extending between the top edge and the bottom edge, each of said opposite side edges being joined along at least a portion of its length to a corresponding side edge of an adjacent wall of the plurality of walls to form a corner of the wall unit, said wall unit including an access port in at least one wall of said plurality of walls for at least one of entering and leaving the shelter and viewing objects outside while inside the shelter;

an upper rigid shell having a central portion surrounded by a channel sized and shaped for receiving the top edges of walls of the wall unit so the upper shell forms a roof of the shelter; and a lower rigid shell having a central portion surrounded by a channel sized and shaped for receiving the bottom edges of walls of the wall unit so the lower shell forms a floor of the shelter;

wherein each of the channels comprises opposing vertical side walls connected by a horizontal wall, wherein the horizontal walls are disposed between an uppermost end and a lowermost end of the shelter.

2. A shelter as set forth in claim 1 wherein the upper rigid shell includes a rim extending around its channel surrounding the lower rigid shell when the upper rigid shell is positioned in face-to-face relation with the lower rigid shell.

3. A shelter as set forth in claim 2 wherein the wall unit is collapsible for positioning between the upper rigid shell and the lower rigid shell when the rim surrounds the lower rigid shell and the upper rigid shell is positioned in face-to-face relation with the lower rigid shell.

4. A shelter as set forth in claim 3 wherein the wall unit is collapsible for positioning between the upper rigid shell and the lower rigid shell when the rim surrounds the lower rigid shell and the channel of the upper rigid shell is positioned in face-to-face relation with the channel of the lower rigid shell.

5. A shelter as set forth in claim 4 wherein the wall unit consists of four walls, two opposing walls being foldable inward at their respective centers for collapsing the wall unit.

6. A shelter as set forth in claim 5 wherein two opposing walls are foldless.

7. A shelter as set forth in claim 6 wherein the access port comprises a door cut in one of said two opposing foldless walls.

8. A shelter as set forth in claim 7 wherein the access port comprises a window cut in each of said walls of said plurality of walls.

9. A shelter as set forth in claim 2 wherein the upper rigid shell and the lower rigid shell are identical except that the upper rigid shell includes the rim.

10. A shelter as set forth in claim 2 wherein the rim of the upper rigid shell is uninterrupted.

11. A method of assembling the shelter of claim 1, said method comprising the steps of:

unfolding the wall unit, thereby forming a tubular wall unit;

orienting the lower rigid shell so the channel of the lower shell faces upward;

inserting the bottom edges of the plurality of walls of the unfolded tubular wall unit in the channel of the lower shell; and positioning the upper shell on the plurality of walls so the channel of the upper shell receives the top edges of the plurality of walls of the unfolded tubular wall unit, thereby forming the shelter.

12. A method of preparing for transport a shelter comprising a wall unit, an upper rigid shell, and a lower rigid shell, said method comprising the steps of:

removing the upper shell from the wall unit;

orienting the upper shell so a channel of the upper shell faces upward;

lifting the wall unit out of a channel in the lower shell;

folding the wall unit to a flat configuration;

positioning the folded wall unit on top of the upward oriented upper shell so the wall unit lays against a face of a flange of the upper shell and the wall unit is entirely received in a rim surrounding the upper shell;

positioning the lower shell so the channel of the lower shell faces the folded wall unit, so a face of a flange of the lower shell lays against the wall unit received in the rim of the upper shell, and so the rim of the upper shell surrounds the flange of the lower shell; and joining the upper shell and the lower shell to hold the wall unit between the upper shell and the lower shell.

\* \* \* \* \*